United States Patent [19]
Bricot et al.

[11] 4,059,841
[45] Nov. 22, 1977

[54] OPTICAL READ-OUT SYSTEM INCLUDING ASYMETRICAL BEAM INTENSITY AND FOUR DETECTOR CELLS

[75] Inventors: Claude Bricot; Jean-Claude Lehureau, both of Paris, France

[73] Assignee: Thomson-Brandt, Paris, France

[21] Appl. No.: 726,161

[22] Filed: Sept. 24, 1976

[30] Foreign Application Priority Data

Sept. 29, 1975 France .................... 75.29707

[51] Int. Cl.² .................... H04N 5/76; G11B 7/12
[52] U.S. Cl. .................... 358/128; 179/100.3 V; 250/201; 250/202; 250/570
[58] Field of Search .................... 358/128, 4, 127, 130; 179/100.3 V, 100.3 G, 100.41 L; 340/173 LT, 173 LN; 250/201, 202, 570, 204, 566

[56] References Cited

U.S. PATENT DOCUMENTS

| | | | |
|---|---|---|---|
| 3,909,608 | 9/1975 | LeMerer et al. | 250/202 |
| 3,913,076 | 10/1975 | Le Hureau et al. | 340/173 LT |
| 3,962,721 | 6/1976 | Dettaan | 358/8 |
| 3,971,002 | 6/1976 | Bricot et al. | 340/173 LT |
| 3,983,317 | 9/1976 | Glorioso | 358/128 |
| 3,991,275 | 11/1976 | Boulthuis | 358/128 |
| 4,001,494 | 1/1977 | Adler | 358/127 |
| 4,006,293 | 2/1977 | Bouwhuis | 358/128 |
| 4,011,400 | 3/1977 | Simons et al. | 358/127 |
| 4,025,949 | 5/1977 | Whitman | 358/128 |
| T953,002 | 12/1976 | Firester | 179/100.3 V |

*Primary Examiner*—Raymond F. Cardillo, Jr.
*Attorney, Agent, or Firm*—Cushman, Darby & Cushman

[57] ABSTRACT

The invention relates to the optical reading of a support comprising a track along which is arranged a series of information items which optically translate a carrier wave angularly modulated by the information. The read-out system uses a single lens for projecting a quasi-punctiform spot onto the support; a photodetector comprising four cells arranged in a square and asymmetrical illumination of the lens to ensure detection of the information and simultaneous supply of defocussing and tracking deviation signals.

22 Claims, 11 Drawing Figures

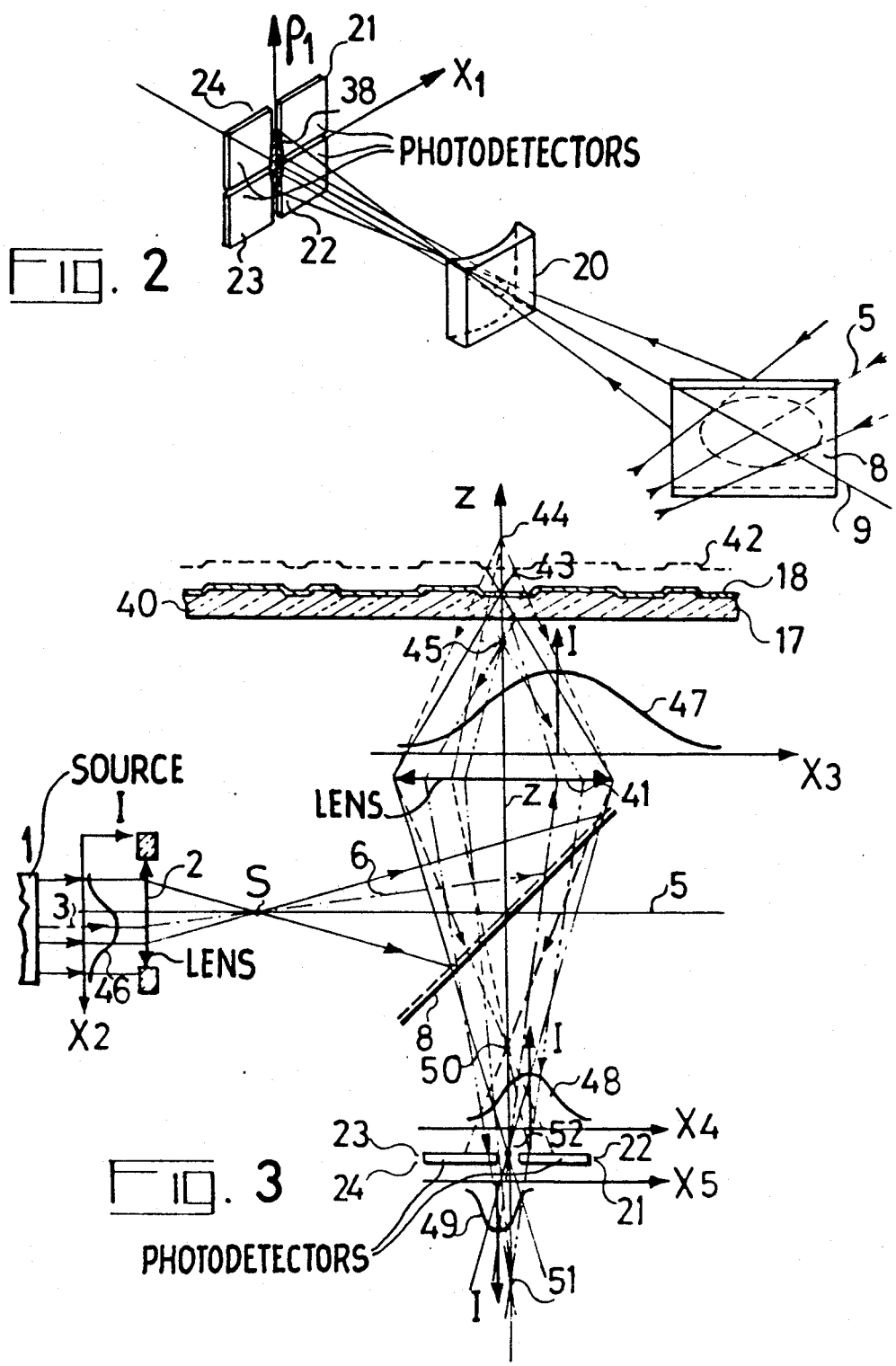

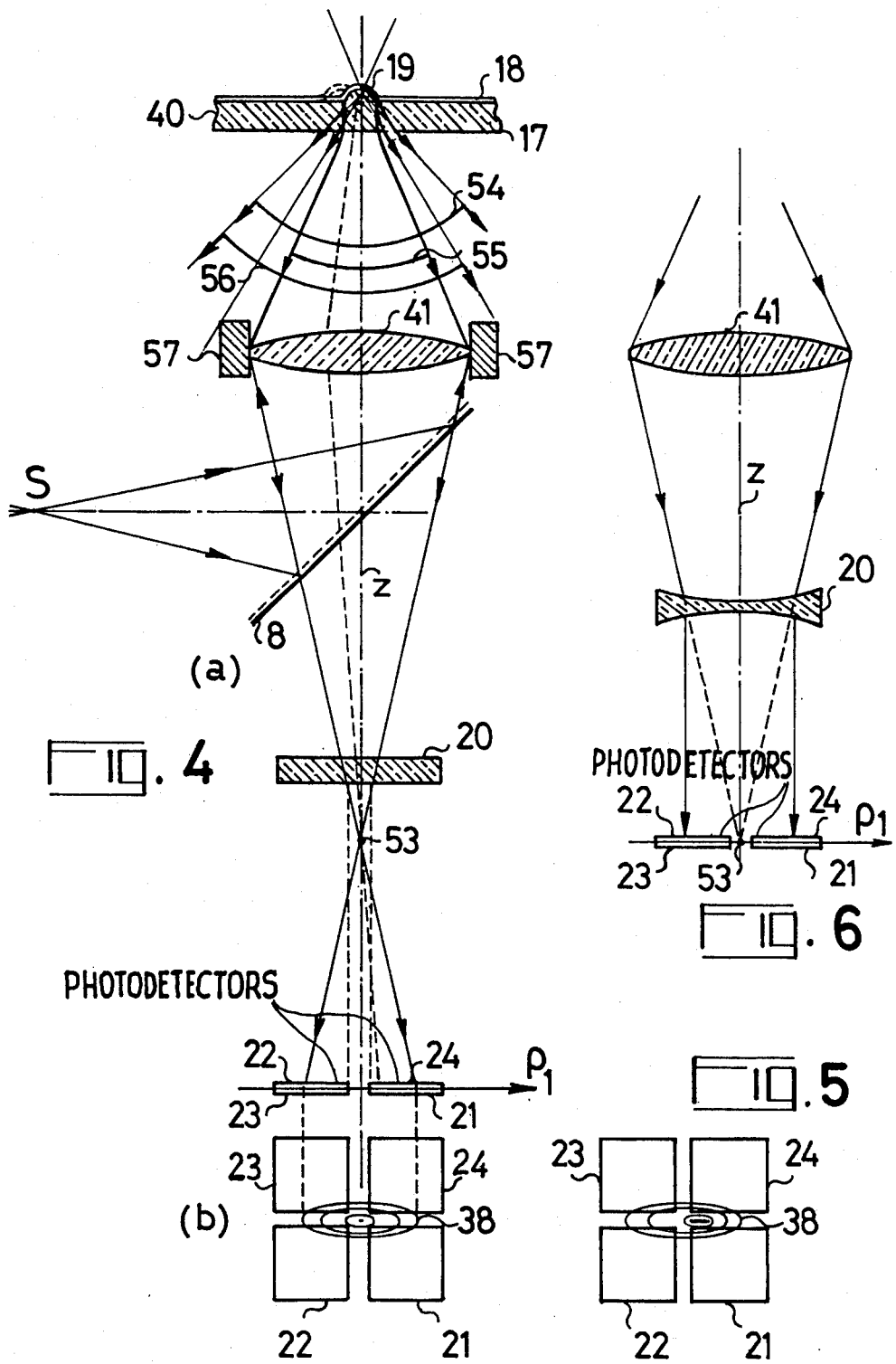

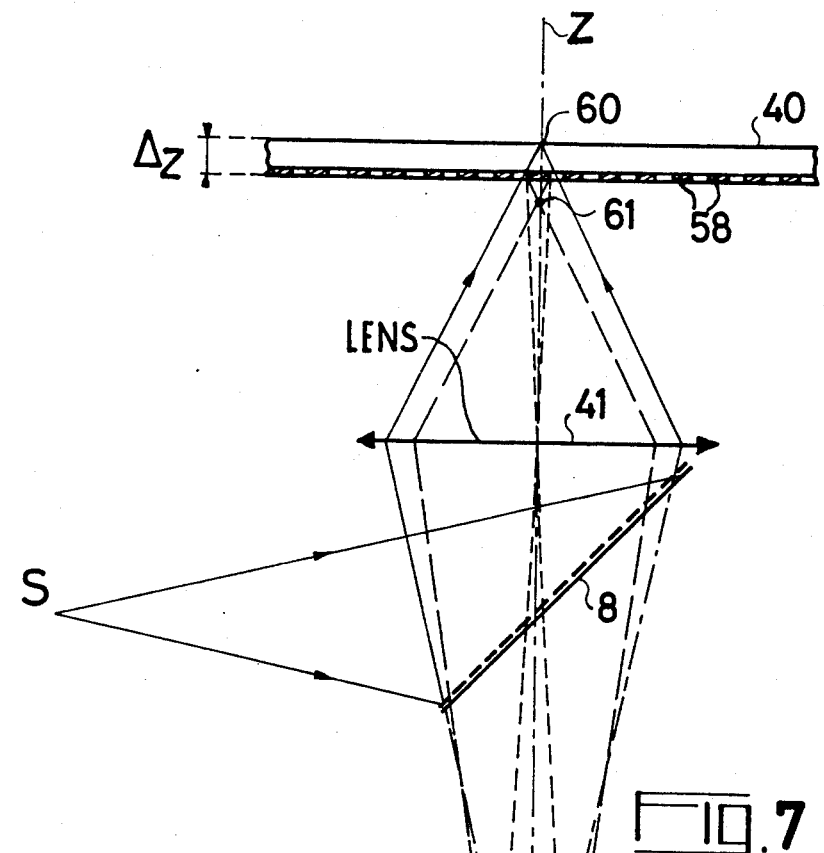
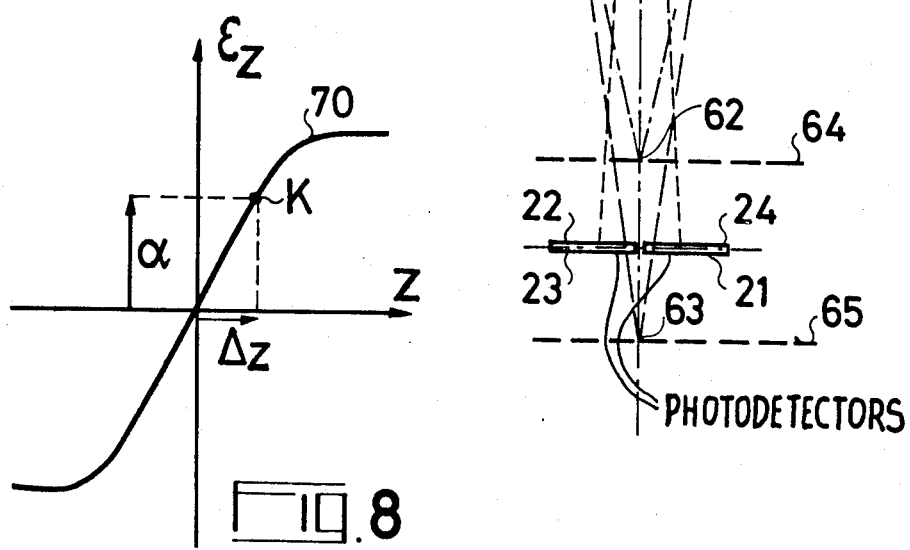

OPTICAL READ-OUT SYSTEM INCLUDING ASYMETRICAL BEAM INTENSITY AND FOUR DETECTOR CELLS

This invention relates to the optical reading of a recording comprising a support in the form of a disc or tape on which a succession of information items of non-uniform length and spacing have been recorded along a narrow track of substantially constant width. This succession of information items may be used to represent a carrier-wave angularly modulated by the information to be read. It may be in the form of a relief impression in the form of a string of micropits or in the form of a layer of which the reflection or transmission coefficient has two separate values, the alternation of these values enabling a string of dashes to be materialised. In order to store video-frequency signals, it is standard practice for the track to be composed of adjacent elements separated by an interval of a few microns. Thus, in the case of an information support in disc form, a spiral configuration is adopted for the track, the width of the track being of the order of 1 micron. When a recording such as this is read by reflection or transmission, the track is illuminated by a reading spot of which the dimensions are comparable with the width mentioned above and, in order to produce this quasipunctiform illumination, a projection lens is associated with a source of coherent light of the laser type.

During reading, the point of convergence of the beam illuminating the information support has a tendency to move away from the reading surface containing the track and also to move on that surface by straying from the longitudinal axis of the track. This results in focussing and tracking deviations which have to be detected and controlled by means of suitable feed back loops.

The use of a coherent light source of which the highly reflecting emissive surface forms an optical cavity with the surface of the information support results in the appearance of undesirable standing wave fluctuations in the intensity of the reading signal which are attributable to dimensional variations in the optical cavity. Accordingly, provision has to be made for effective optical decoupling in the optical reader.

It follows from the foregoing that an optical reading apparatus, whether operating by reflection or by transmission, must of necessity comprise the reading means incorporating the light source, the projection lens and the photodetector element delivering the reading signal, in addition to which it is necessary to provide sensors for the deviations in focussing and tracking and also effective optical decoupling means. Analysis of conventional optical reading apparatus reveals the fairly considerable complexity of the solutions hitherto applied, because the use of optical elements can be troublesome, and the need to make adjustments which should always be avoided in any mass production process.

An object of the present invention is to provide a reading device in which the disadvantages which have just been pointed out are substantially reduced, even eliminated, by virtue of a particularly simple structural arrangement. This simple arrangement uses inexpensive elements of which the positioning does not involve any problem of regulation.

In accordance with the present invention, there is provided an optical read-out system for optically reading a recording in the form of a support carrying a track of substantially constant width arranged in a reading surface; said track being made of a string of information items having non-uniform length and spacing; said information items ensuring by an alternative modification of a physical characteristic of said reading surface, the transcription of an angularly modulated waveform carrying the information stored in said recording; said optical read-out system comprising: a source of coherent light, a lens arranged for causing said coherent light to converge into a reading spot illuminating a single area of said track extending across said width and photodetector means arranged for collecting through said lens, a fraction of the modulated light emerging from said single area; the spatial distribution of the luminous intensities of the light beam incident upon the aperture of said lens being rendered asymmetrical in a direction coinciding with the direction of scanning of said track by said reading spot; said photodetector means comprising four cells arranged respectively along the quadrants of a detection plane; the crossed lines of separation of said quadrants forming a rectangular trihedron with the optical axis of said lens; one of said crossed lines of separation being oriented in said direction of scanning; each pair of said cells pertaining to two contiguous portions of said quadrants being electrically connected to a summation circuit; said summation circuit belonging to a set of four summation circuits delivering four electrical signals representative of the light energies respectively collected on each side of said crossed lines of separation; said electrical signals being applied to first and second subtraction circuits; the first of said subtraction circuits having two inputs fed respectively by those of said cells situated on the two sides of one of said crossed lines of separation; the second of said subtraction circuits having two inputs fed respectively by those of said cells situated on the two sides of the other of said crossed lines of separation.

It should be noted from the outset that, although the reading device according to the invention may be used for reading a support readable by reflection, it may be completed by an auxiliary photodetector device enabling it to read a support readable by transmission.

For a better understanding of the present invention and to show how the same may be carried into effect reference will be made to the following description and the accompanying drawings among which:

FIG. 2 is an isometric view of a variant of a detail of the structure shown in FIG. 1;

FIG. 3 is diagram illustrating the operation of the device shown in FIG. 1, as a defocussing sensor;

Figure 1:
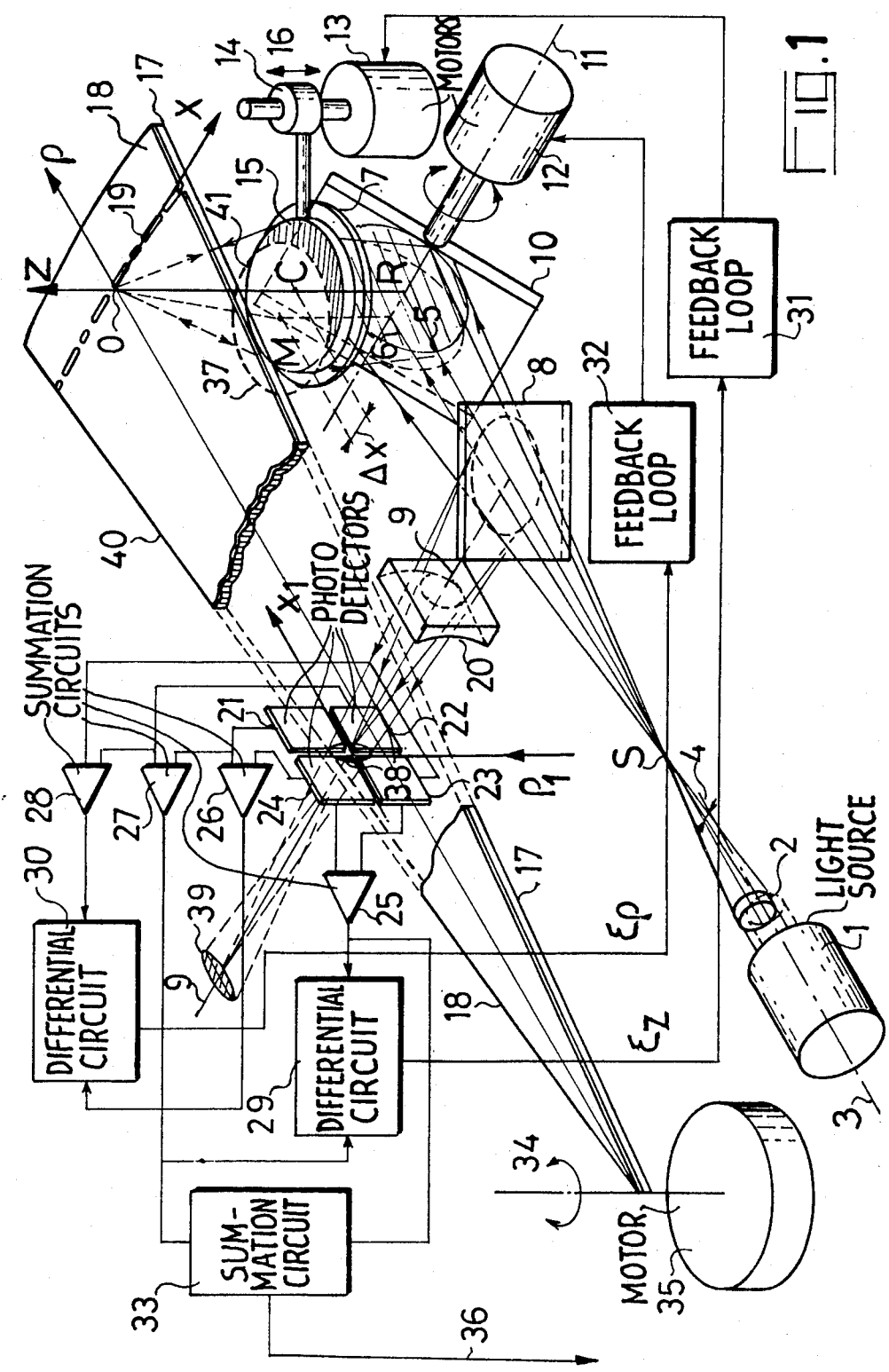
FIG. 1 is an isometric view of a reading device according to the invention.
Figure 9:
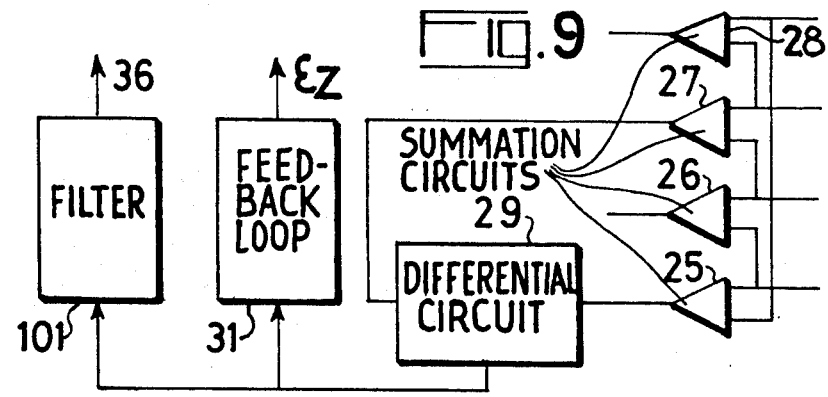
Figure 11:
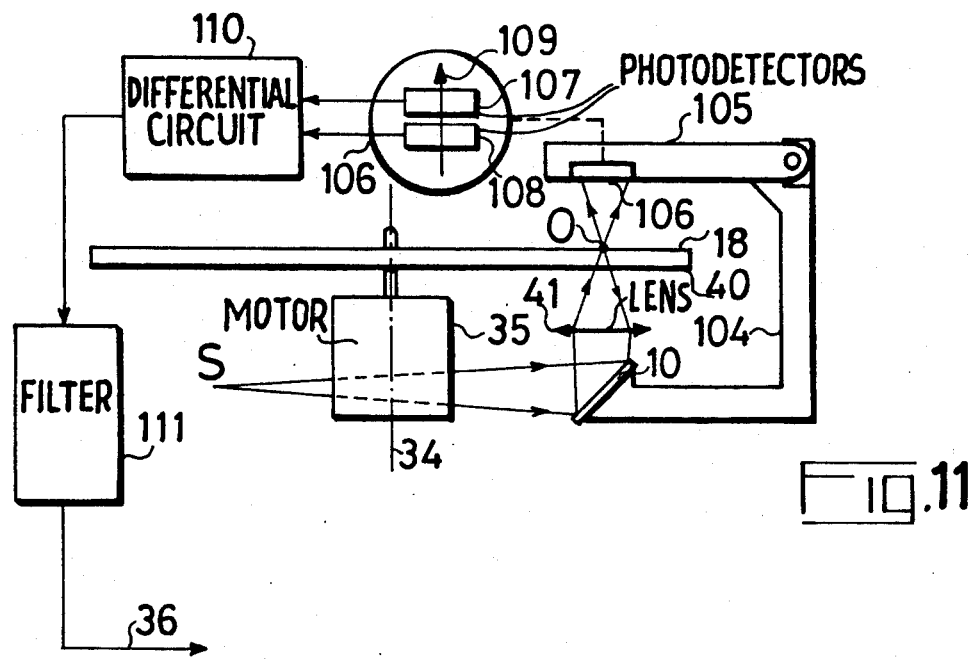

FIGS. 4(a) and 4(b) are diagrams illustrating the operation of the device shown in FIG. 1 as a sensor for tracking deviations;

FIG. 5 is an explanatory diagram;

FIG. 6 shows a variant which is applicable to the arrangement shown in FIG. 4;

FIG. 7 shows another variant of a structural detail applicable to the arrangement shown in FIG. 1;

FIG. 8 is a diagram showing the response characteristic of the defocussing sensor according to the invention;

FIG. 9 shows a variant of the electrical circuits connected to the photodetector elements of FIG. 1;

FIGS. 10(a) and 10(b) are, explanatory diagrams;

FIG. 11 shows a compatible optical reading device adapted for reading both by reflection and by transmission.

FIG. 1 shows parts of an information support in the form of a disc 40 which, by way of non-limiting example, comprises a transparent substrate 17 coated with a reflective layer 18. The layer 18 comprises a relief impression in the form of a spiral track of which part of a turn is shown in FIG. 1. This fragment, seen by the observer situated below the disc 40, is composed of a series of micropits 19 having a substantially constant width in the radial direction ρ. The length and spacing of the micropits 19 in the scanning direction OX of the track are non-uniform so as to ensure the transcription of a carrier wave angularly modulated by the information recorded on the disc 40.

The reading device according to the invention comprises a motor 35 of which the spindle rotates the disc about the axis 34. It additionally comprises an optical reading assembly which includes: a source 1 of coherent light; a condenser lens 2 which projects the light issuing from the reading source 1 to the point of convergence S; a semi-transparent plate 8; a return mirror 10 which is arranged to pivot about an axis 11 parallel to the direction OX; a projection lens 41 with an optical axis OZ and an optical centre C; a movable lens holder 14; a quarter wave plate 7 traversed by the light passing through the lens 41; motors 12 and 13 respectively controlling the pivoting of the mirror 10 and the movement along 16 of the lens holder 14; a cylindrical lens 20; an assembly of photodetector cells 21, 22, 23 and 24; summation circuits 25, 26, 27 and 28; circuits with differential inputs 29 and 30; another summation circuit 33; and finally two control loops 31 and 32 which ensure that the point of convergence of the beam illuminating the disc 40 remains centred on the track 19 and occupies such a position, relative to the reading surface 18, that the reading spot only illuminates a single area of the track.

It can be seen from FIG. 1 that the source point S is situated on the axis 5 which corresponds to the return direction of the optical axis OZ so that it arises out of the reflection at R on the mirror 10. The axis OZ can thus pivot in the plane ρOZ under the control of the motor 12. The lens 41 forms an image of the point S at O and this image is able to move radially to ensure following of the track 19 in dependence upon a signal $\epsilon_p$ representing the tracking deviation. Since the track is in the form of a spiral, the optical assembly has to be radially displaced relative to the disc, although the means intended to produce this movement in synchronism with the rotation of the disc are not shown in FIG. 1.

The reading surface 18 behaves in the same way as a flat mirror perpendicular to the axis OZ and returns a divergent beam towards the lens 41. The beam emerges from the lens 41 and, after having been reflected at the mirror 10 and the semi-transparent plate, it forms a secondary image of the point S in the detection plane $\rho_1 x_1$. This secondary image is stigmatic in the absence of the cylindrical lens 20, but the presence of this lens gives rise by anamorphosis to the formation of two oblong spots 38 and 39, one situated in the plane $\rho_1 x_1$ and the other beyond that plane. The two oblong spots are centered on the axis 9 which is the image produced by the plate 8 of the direction 5 passing through S. Hitherto it has been assumed that the reflection at the disc takes place when the surface 18 contains the convergence point O, i.e. when the reading beam incident upon the disc is focussed in the reading surface.

When the point of convergence O of the reading beam moves away from the reading surface, the device shown in FIG. 1 supplies a signal $\epsilon_z$ which represents the defocussing of the reading spot. To this end, the device shown in FIG. 1 is arranged in such a way that the distribution of the intensities of the light received by the aperture of the lens 41 from the source 1 is asymmetrical in the direction $O_x$ in which the track is scanned.

According to the invention, this result is obtained by laterally offsetting the emission axis 3 of the source 1 by a translation of amplitude 4. Under these conditions, the source 1 provides, in the plane of the aperture of the lens 41, an illumination of which the point M corresponds to the maximum intensity and of which the circular contour 37 represents an equal illumination line. The distance $\Delta_x$ between the point M and the optical center C of the lens 41 is determined by the distance 4 which separates the axis 3 from the parallel direction 5, and this distance $\Delta_x$ gives rise to asymmetry in the illumination of the aperture because the hatched area 15 receives less energy than the complementary non-hatched area.

Without offsetting the axis 3, it would also be possible to obtain asymmetry of illumination by means of an opaque cover partially intercepting the light received by the aperture of the lens 41. The cover does not have to follow the shape of the zone 15, although it should encroach in such a way that the asymmetry of illumination takes place in the direction $O_x$.

So far as the defocussing signal $\epsilon_z$ is concerned, the operation of the device illustrated in FIG. 1 may be more readily understood by reference to the simplified diagram in FIG. 3.

The principal elements of FIG. 1 are denoted by the same references in FIG. 3. However, the configuration adopted differs from that shown in FIG. 1 on the omission of the return mirror 10, the quarter wave plate 7 and the lens 20, because these elements do not play a part of any significance in the detection of defocussing. In addition, to illustrate a variant of the optical arrangement, the semi-transparent plate 8 reflects the light issuing from the point S and transmits it towards the photodetectors 21, 22, 23 and 24.

The source 1 emits a beam of radiant energy of which the intensity maximum is situated on the axis 3 which is offset relative to the direction 5. The diagram I, $X_2$ represents the distribution of the intensity radiated in the cross-section of the beam by a bell-shaped curve 46. The beam 6 shown in dash-dot lines corresponds to the intensity maximum of the curve 46. This beam 6 passes through S and, after reflection, impinges on the lens 41 at a point which, in FIG. 1, is the point M. The illumination received by the lens 41 has an asymmetrical distribution, as illustrated by the diagram I, $X_3$ and the bell-shaped curve 47. The difference $\Delta_x$ visible in FIG. 1 is situated in the plane of FIG. 3 and the scanning direction of the support 40 is situated in the plane of the figure. The convergence point of the reading beam which emerges from the lens 41 occupies the position 43 which, in the absence of defocussing, coincides with the reflecting reading surface 18 of the support 40. In the focussed state, the beam reflected by the surface 18 passes through the lens 41 and the semitransparent plate 8 and converges at 52 in the detection plane. The reflected light falls into the gap separating the two groups of photodetectors 21, 22 and 23, 24. The result of this is that the voltage supplied by the differential circuit 23 is on average zero.

By contrast, if the reading surface 18 occupies the position 42 further away from the lens 41, it can be seen in FIG. 3 that the reflected light seems to come from the image point 44 with which the focussing point 50 is associated. In the detection plane, the diagram I, $X_4$ supplies the intensity distribution represented by the curve 48. In the final analysis, the photodetectors 21 and 22 receive more radiated energy than the photodetectors 23 and 24, resulting in the delivery at the output of the differential circuit 29 of a voltage of which the average value is not zero and of which the amplitude increases with defocussing.

Similar reasoning applies when the support 40 has moved towards the lens 41. In this case, it can be seen, taking into account the point of convergence 45, its conjugate point 51, the diagram I, $X_5$ and the curve 51, that the mean voltage at the output of the differential circuit 29 has changed sign. Accordingly, the signal supplied by the differential circuit 29 does in fact contain the information relating to the extent and to the direction of defocussing.

In FIG. 1, provision was made to feed a summation circuit 33 by means of signals emanating from summation circuits 25 and 27. The output 31 of the summation circuit 33 delivers a signal representing the information retranscribed along the track because, when a micropit is illuminated by the reading spot, the light reflected by the reading surface is diffracted and the fraction collected by the lens 41 is thus reduced.

In order to detect the tracking deviation $\epsilon_p$, the arrangement shown in FIG. 1 is equipped with four photodetectors cells and with a cylindrical lens 20. This lens introduces an astigmatism of the beam illuminating the photodetector cells so that the tracking deviation is detected by the so-called "far field" technique. In FIG. 1, the cylindrical lens 20 is a divergent lens. It reduces the vergency of the beam passing through it in the plane which contains the axes $\rho_1$ and 9. A similar result could be obtained with a convergent cylindrical lens. In addition, FIG. 2 shows a detail of embodiment which represents another method of introducing the astigmatism required for operation on the "remote field" principle. In this variant, the detection plane $X_1$, $\rho_1$ is remote from the point of convergence of the beam reflected by the plate 8. The cylindrical lens 20 is positioned slightly ahead of this convergence point and reduces the vergency of the beam in the plane $X_1$, 9 so that only a convergence in the detection plane is obtained for this plane. In this case, it is also possible to use a convergent cylindrical lens which is positioned slightly beyond the convergence point mentioned above.

The variant illustrated in FIG. 2 has the advantage of supplying an oblong spot which is fairly elongate in its minor dimension on the photodetectors, which facilitates the formation of a photodetector group of which the cells may be less close to one another.

The operation of the device as a sensor for the tracking deviation $\epsilon_p$ may be understood with the aid of the diagram shown in FIG. 4 to which the arrangement shown in FIG. 2 corresponds. In FIG. 4 the references used are the same as in the previous figures, although to make the explanation clearer, the light source S is disposed laterally and illuminates the lens after reflection at the plate 8, whereas the return beam passes through the plate 8 in a straight line. Due to the fact that the plane of the figure is the plane which contains the axis $\rho$ and the optical axis Z, the micropits 19 are seen in profile and, in order to illustrate a tracking deviation, one of the micropits has been shown in dotted lines adjacent its centered profile which itself is shown in solid lines.

It can be seen at (a) in FIG. 4 that the beam illuminating the reading surface 19 gives rise to the formation of a return beam which converges at the point of convergence 53 but which, due to the cylindrical lens 20, projects into the line detection plane $\rho_1$ an oblong spot 38 such as shown at (b). When the reading spot only illuminates a flat portion of the detection surface 18, the return beam has a wave front 55 which is symmetrical in relation to the optical axis Z. Almost all the energy received by the surface 18 is taken up by the lens 41 and the oblong spot 38 is intense and is made up of contours of equal intensity centered relative to another. The result of this is that the mean value of the signal $\epsilon_p$ at the output of the differential circuit 30 is zero. When the reading spot illuminates a micropit 19 without any tracking deviation, the return beam has a wave front 54 which, although more open, is still symmetrical in relation to the axis Z. The oblong spot 38 still has the configuration of FIG. 4(b), although it is less intense. The mean value of the signal $\epsilon_p$ is still zero.

By contrast, if the reading spot illuminates a micropit such as shown in dotted lines offset to the left, the return beam has a wave front 56 which, although more open, is disposed asymmetrically in relation to the optical axis OZ. The result of this is that the oblong spot 38 has the configuration of FIG. 5 which is characterised by contours of equal intensity offset towards the group of photodetectors 21 and 24. A signal $\epsilon_p$, of which the mean value in terms of magnitude and size is dependent upon the tracking deviation, is obtained at the output of the differential circuit 30.

FIG. 6 is a diagram which corresponds to the arrangement of FIG. 1. The convergence point 53 is situated in the line detection plane $\rho_1$, although the oblong spot projected has the same appearance as that shown at (b) in FIG. 4 and in FIG. 5.

Thus, far the description has concentrated on the operation of the arrangement shown in FIG. 1 both as a defocussing sensor and as a sensor for tracking deviations. It is obvious that the operation of the arrangement as a defocussing sensor is associated solely with the reflective character, even partial, of the reading surface. By contrast, the operation of the arrangement as a sensor for tracking deviations depends directly upon the existence of the track and its structure. When the spot is suitably focussed and centered on the track, a reading signal 36 may be obtained for example by connecting the output terminals of the summation circuits 25 and 27 to the two inputs of a summation circuit 33. In the interests of simplicity, however, because a subtraction circuit 29 is already available for forming the defocussing signal $\epsilon_z$, it is possible to collect a differentiated reading signal by connecting a band pass filter 101 to the output of the subtraction circuit 29. This solution is shown in FIG. 9 where the references used are the same as in FIG. 1.

Figure 10:
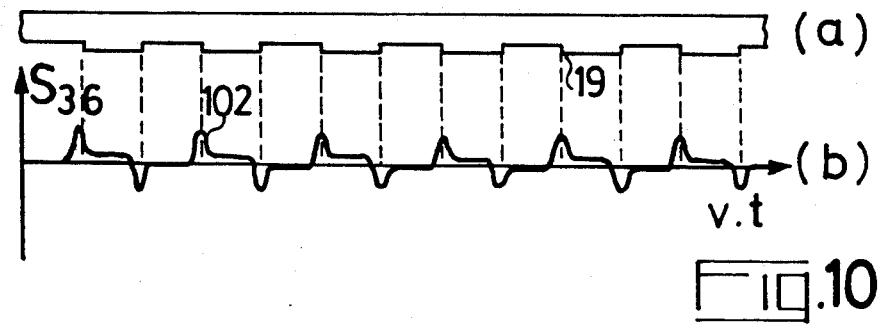

FIG. 10 is an explanatory diagram which illustrates the relationship between the engraving of the track and the differential reading signal $S_{36}$. The differential reading signal is represented by the curve 102 along the axis $v.t$ where $v$ is the scanning speed of the reading spot and $t$ the time. It can be seen that the passing of a pit 19 is marked by pulses of opposite sign which are centered on the input and output steps which define its length in the scanning direction. When the passages through zero of the wave form 102 and the rectangular wave, of which the transitions coincide with these passages through zero, are borne in mind, the duty factor which determines the width ratio of the crenels is substantially unchanged in relation to that of the engraving. By contrast, if the reading signal is extracted at the output of the summation circuit 33, the duty factor changes to an extent which is greater, the more closely the pitch of the engraving approaches the size of the reading spot. If the engraving comprises both the low-frequency components and also the high-frequency components, it is perfectly possible to mix the signals supplied by the summation circuit 33 and by the filter 101 to give a reading signal which most effectively translates the engraving carried by the track. In that case, the reading signal is in the form of a wave of rectangular appearance with transitions having a finite gradient, irrespective of the inscribed frequency.

With regard to the nature of the physical characteristic of the support which may be used as a base for the transcription of information, it is known that there are two possible choices. The case where the support behaves like a phase object has already been contemplated, although it is also necessary to consider the case where the support has a smooth structure made up of lines of which the reflective power differs from that of the adjacent surface portions. The operation of the defocussing sensor remains the same and a response curve such as shown at 70 in the diagram of FIG. 8 is again obtained. However, to enable the track to be read and for detecting the radial deviation, it is necessary to resort to a slightly defocussed reading mode, such as illustrated in FIG. 7.

FIG. 7 shows an information support 40 comprising a layer capable of modulating the intensity of a beam when it is reflected there. This layer acts as an amplitude object and, in FIG. 7, is made up of hatched adjacent areas 58 which represent adjacent track sections. Along each track section, the information is in the form of a succession of lines of non-uniform length and spacing.

FIG. 7 shows certain elements of the preceding figures with the same reference numerals, although the focussing control loop is regulated in such a way that, in its ideal reading position, the lens 41 projects a beam of which the convergence point 60 is displaced by the amount $\Delta z$ relative to the reading surface 58. The defocussing $\Delta z$ produces a slight enlargement of the reading spot so that a track section is illuminated along with its two edges. To this end, a comparison is made in the focussing control loop between the deviation signal $\epsilon_z$ and a reference voltage $\alpha$ which, in the diagram of FIG. 8, corresponds to the ordinate of the rest point K. In this same figure, the deviation $\Delta z$ is the abscissa of the point K.

Referring to the return beam which emerges from the illuminated area of the track 58, it can be seen that, in the absence of defocussing $\Delta z$, this beam would converge at the point 62 of a plane 64 because the point 62 is the conjugate of the point 60.

Taking the defocussing $\Delta z$ into account, the reading surface 58 reflects an image 61 of the point 60 and this image 61 is conjugated with a convergence point 63 of the return beam which is situated in the plane 65. In order to enable the amplitude information contained in the reading surface 58 to be read, the photodetectors 21, 22, 23 and 24 are situated between the two planes 64 and 65 in accordance with the invention, because it is in this intermediate position that a clear image of the illuminated portion of the track is projected by the lens 41 onto the photodetectors. By means of the circuits shown in FIG. 1 or in FIG. 9, signals similar to those obtained with a phase object are again obtained. In addition, experience gained by replacing the information support of FIG. 7 by the information support illustrated in FIG. 1 shows that the arrangement of FIG. 7 may also be used for reading a support of the phase object type provided that the depth of impression supplies an optical phase shift of less than $\pi$. It can be seen that the depth of impression is considerably less than one micron and that the defocussing $\Delta z$ is of the order of one micron. It can also be seen that the reading arrangement diagrammatically illustrated in FIG. 7 does not use a cylindrical lens. These findings have resulted in a final simplification of the arrangements illustrated in FIGS. 1 and 2 which consists in omitting the cylindrical lens 20. Experience has shown that, when the focussing control loop is in operation, the tracking deviation is still suitably detected despite the absence of the cylindrical lens.

With regard to the optical decoupling required for the operation without any cavity noise of the reading system, the solution which has proved to be the most simple consists in using a non-polarized laser as the source of coherent light and in arranging a suitably oriented quarter wave plate in the optical path.

A non-polarized laser has a simpler structure than a polarized laser and supplies a beam made up of several rays of circularly polarized light. The frequency shift of the rays emitted is sufficient not to produce any noticeable interferences at the level of the photodetectors and the circular character of the polarization emitted avoids having to attend to the orientation of the source during the assembly operations.

In order suitably to orient the quarter wave plate arranged in the path of the reading beam, it is necessary to take into account the modifications in polarization introduced by the reflective optical elements. In FIG. 1, the reading beam undergoes reflection of quasi-normal incidence at the information support 40 and also oblique reflections, especially at the semitransparent plate 8 and the return mirror 10. It has been found in practice that each oblique metallic reflection introduces a partial polarization of the beam and a differential phase shift in two directions, one of which is perpendicular to the incidence plane whilst the other is contained in the incidence plane and is normal to the direction of propagation. When the different incidence planes associated with the obliquely reflecting elements are selected parallel to one another or orthogonal, the two directions with which the partial polarization and differential phase shift effects are associated retain homologous orientations at any point of the optical path. The principal axes of the quarter wave plate may thus be oriented along the bisectors of these two directions which are associated with the arrangement of the mirrors. In FIG. 1, a quarter wave plate 7 intercepts the reading beam between the information support 40 and the reflective element 10 which obliquely returns the beam towards the information support 40. For this path section, the two directions in which the partial polarization and the differential phase shift are analysed are respectively the direction $\rho$ and the direction X. The principal axes of the quarter wave plate 7 are oriented along the bisectors of the directions $\rho$ and X, so that the wave reflected towards the source 1, after a simple outward and return passage, is a wave of circular polarization, but directed oppositely to that of the wave emitted by the source 1. Accordingly, there are no interference phenomena between the wave emitted and the wave returned a first time towards the source 1. By contrast, the wave returned towards the source 1, after two outward and return passages, is in danger of producing optical cavity noise. In order to obviate this disadvantage, provision is made for heavy attenuation along the optical path which joins the support and the emissive surface of the source 1. If the information support has a relatively high reflection coefficient, the transmission and reflection coefficients of the plate 8 are selected in such a way that the attenuation introduced is preponderant along the optical source/information support path. With the configuration adopted in FIG. 1, it can be seen that a low transmission coefficient and a high reflection coefficient, amounting for example to 20% and 80%, respectively, have to be selected for the plate 8. In the case of the configuration adopted in FIGS. 3, 4 and 7, it is the transmission coefficient which has to outweigh the reflection coefficient of the plate 8. If a polarized laser is used, its polarization plane has to be oriented parallel to one of the two directions with which the above-mentioned effects are associated.

Taking into account everything that has been said in the foregoing, it can be seen that the arrangement shown in FIG. 1 and its variants supply all the desirable detections with a very limited number of constituents of which most are relatively inexpensive and may readily be implanted in the optical arrangement.

In conclusion, it should be pointed out that this strict economy of means is maintained in the case of a reading arrangement compatible with reading by reflection and by transmission.

FIG. 11 diagrammatically illustrates a reading arrangement which is the same as that shown in FIG. 1 in regard to the elements situated below the information support. In addition, this reading arrangement is capable of reading a non-opaque disc by transmission by means of an additional set 106 of photodetector cells. The pivotal mounting 105 of the supporting arm 104 enables the photodetector cells 107 and 108 to be arranged above the support in such a way that they receive the beam which emerges from the illuminated portion 0 of the reading surface 18. The cells 107 and 108 are coupled with the optical assembly situated below the disc and their separation line passes through the extension of the optical axis of the lens 41. Focussing of the reading spot 0 and tracking are entirely dependent upon the elements which ensure reading by reflection. In order to obtain the reading signal, the separation line of the cells 107 and 108 is perpendicular to the direction 109 in which the track is scanned. A differential circuit 110 supplies a reading signal similar in shape to that illustrated in FIG. 10, and a band pass filter 111 transmits the useful components of the reading signal towards an output terminal 36 which is connectible with a similar terminal situated in the reflection reading arrangement when the reading mode is changed. It can be seen that the hinged arm 105 may be formed by a stabilizing plate which covers the disc 40 during reading.

What we claim is:

1. Optical readout system for optically reading a recording in the form of a support carrying a track of substantially constant width arranged in a reading surface; said track being made of a string of information items having non-uniform length and spacing, said information items ensuring by an alternative modification of a physical characteristic of said reading surface, the transcription of an angularly modulated waveform carrying the information stored in said recording; said optical readout system comprising: a source of coherent light, a lens arranged for causing said coherent light to converge into a reading spot illuminating a single area of said track extending across said width and photodetector means arranged for collecting, through said lens, a fraction of the modulated light emerging from said single area; the spatial distribution of the luminous intensities of the light beam incident upon the aperture of said lens being rendered asymmetrical in a direction coinciding with the direction of scanning of said track by said reading spot; said photodetector means comprising four cells arranged respectively along the quadrants of a detection plane; the crossed lines of separation of said quadrants forming a rectangular trihedron with the optical axis of said lens; one of said crossed lines of separation being oriented in said direction of scanning; each pair of said cells pertaining to two contiguous portions of said quadrants being electrically connected to a summation circuit; said summation circuit belonging to a set of four summation circuits delivering four electrical signals representative of the light energies respectively collected on each side of said crossed lines of separation; said electrical signals being applied to first and second subtraction circuits; the first of said subtraction circuits having two inputs fed respectively by those of said cells situated on the two sides of one of said crossed lines of separation; the second of said substraction circuits having two inputs fed respectively by those of said cells situated on the two sides of the other of said crossed lines of separation.

2. Optical readout system as claimed in claim 1, wherein an image of that portion of said reading surface illuminated by said reading spot is formed by said lens in said detection plane.

3. Optical readout system as claimed in claim 2, wherein an anamorphosis of said image is carried out with a cylindrical lens intercepting the beam incident upon said detection plane; said anamorphized image being in the form of an elongated spot; the major axis of said elongated spot extending along that of said crossed lines of separation in alignement with the direction perpendicular to said scanning direction in said reading surface.

4. Optical readout system as claimed in claim 3, wherein said cylindrical lens is a divergent lens.

5. Optical readout system as claimed in claim 1, wherein an image of that portion of the reading surface illuminated by said reading spot is formed by said lens in a plane separate from said detection plane; an anamorphosis of said image being carried out with a cylindrical lens intercepting the beam incident upon said detection plane; said anamorphized image, as seen in said detection plane, being in the form of an elongated spot; the major axis of said elongated spot extending along that of said crossed lines of separation in alignement with the direction perpendicular to said scanning direction in said reading surface.

6. Optical readout system as claimed in claim 4, wherein said cylindrical lens is a divergent lens.

7. Optical readout system as claimed in claim 1, wherein the output of the first of said subtraction circuits is connected to a first control loop acting on the focussing of the reading beam incident upon said reading surface; a low pass filter being provided in said control loop so as to block the transmission of the components of the reading signal transcribed along the said track; the output of the second of said subtraction circuits being connected to a second control loop acting on the position of the reading spot in the direction of said reading surface perpendicular to said scanning direction.

8. Optical readout system as claimed in claim 7, wherein the output of the first of said subtraction circuits is connected to a band pass filter transmitting said components of the reading signal.

9. Optical readout system as claimed in claim 7, wherein the input terminals of the first of said subtraction circuits are connected to the inputs of a further summation circuit at whose output said reading signal is extracted.

10. Optical readout system as claimed in claim 9, wherein said further summation circuit is followed by a low pass filter selectively transmitting the low-frequency components of said reading signal; the output of the first components of said reading signal; the output of the first of said subtraction circuits being connected to a band-pass filter selectively transmitting the high-frequency components of said reading signal; said low-frequency and high-frequency components being combined at the respective outputs of said filters for forming a full range reading signal.

11. Optical readout system as claimed in claim 1, wherein said spatial distribution of luminous intensities is obtained by offsetting by translation the axis of the beam containing the light emitted by said source so that it does not coincide with the optical axis of said lens; an auxiliary lens situated between said source and said lens focussing said emitted beam on the optical axis of said lens.

12. Optical readout system as claimed in claim 1, wherein said spatial distribution of luminous intensities is obtained by means of an opaque mask which marginally blocks the aperture of said lens.

13. Optical readout system as claimed in claim 1, wherein said information items are formed by micropits.

14. Optical readout system as claimed in claim 1, wherein said information items are formed by dashes of which the reflection coefficient differs from that of the surrounding areas of said reading surface.

15. Optical readout arrangement as claimed in claim 1, further comprising a semi-transparent plate arranged for splitting the optical path section including said lens into two optical path sections leading respectively to said source and to said photodetector means; a quarter wave plate being introduced into said optical path in its rectilinear section entering said lens; the principal axes of said quarter wave plate being directed along the bisectors of the polarization directions respectively normal to the incidence plane of said semi-transparent plate and contained in said incidence plane.

16. Optical readout system as claimed in claim 15, further comprising a return mirror situated between said semi-transparent plate and said quarter wave plate; said return mirror having an axis of rotation oriented in said scanning direction; the incidence planes of said semi-transparent plate and said return mirror forming between them an angle having one of the values 0 and $\pi/2$.

17. Optical readout system as claimed in claim 15, wherein said source is a polarized laser; the polarization plane of said laser being parallel to one of said polarization directions.

18. Optical readout system as claimed in claim 15, wherein said semi-transparent plate has unequal reflection and transmission coefficients; the attenuation introduced by said semitransparent plate into the optical path linking said source and said reading surface being greater than 50 %.

19. Optical readout system as claimed in claim 1, wherein said support comprises auxiliary photodetector means arranged to directly collect the beam which emerges from the illuminated portion of the reading surface through that surface of said support opposite said lens.

20. Optical readout system as claimed in claim 19, wherein said auxiliary photodetector means comprise two adjacent cells; the separation line of said two adjacent cells passing through the optical axis of said lens and being aligned perpendicularly of said scanning direction; each of said two adjacent cells being connected to the two inputs of a supplementary subtraction circuit at whose output the differential reading signal characteristic of the information transcribed along said track is available.

21. Optical readout system as claimed in claim 1, wherein for driving a recording in the form of a disc carrying a spirally arranged track said system comprises means for rotating said support about an axis and further means for obtaining a radial displacement between said support and said reading spot.

22. Optical readout system as claimed in claim 1, wherein said source is a non-polarized laser.

* * * * *